United States Patent [19]

Thompson

[11] 4,354,662

[45] Oct. 19, 1982

[54] FORCE MOTOR

[75] Inventor: Thomas W. Thompson, Concord, N.H.

[73] Assignee: Sanders Associates, Inc., Nashua, N.H.

[21] Appl. No.: 145,152

[22] Filed: Apr. 30, 1980

[51] Int. Cl.³ .................. F16K 31/08; F16K 7/16; F16K 47/02

[52] U.S. Cl. ........................ 251/129; 251/65; 137/625.65; 335/232; 335/265; 335/267

[58] Field of Search ............... 251/129, 141, 65; 137/625.65; 335/265, 267, 232

[56] References Cited

U.S. PATENT DOCUMENTS

| | | | |
|---|---|---|---|
| 3,727,487 | 4/1973 | Forster et al. | 251/129 X |
| 3,858,135 | 12/1974 | Gray | 137/625.65 X |
| 4,040,445 | 8/1977 | McCormick | 137/625.65 X |
| 4,183,375 | 1/1980 | Vick | 137/625.3 |

FOREIGN PATENT DOCUMENTS

| | | | |
|---|---|---|---|
| 2448295 | 4/1976 | Fed. Rep. of Germany | 137/625.3 |
| 936037 | 2/1948 | France | 335/267 |

Primary Examiner—Arnold Rosenthal
Attorney, Agent, or Firm—Louis Etlinger; Ronald Reichman

[57] ABSTRACT

This invention relates to force motors that are used in single stage hydraulic valves that are responsive to electrical input signals. The inertia of the force motor is reduced by having only a small portion of the force motor move. By reducing the mass of the moving parts of the force motor the force motor may be used with an increased speed of response.

7 Claims, 1 Drawing Figure

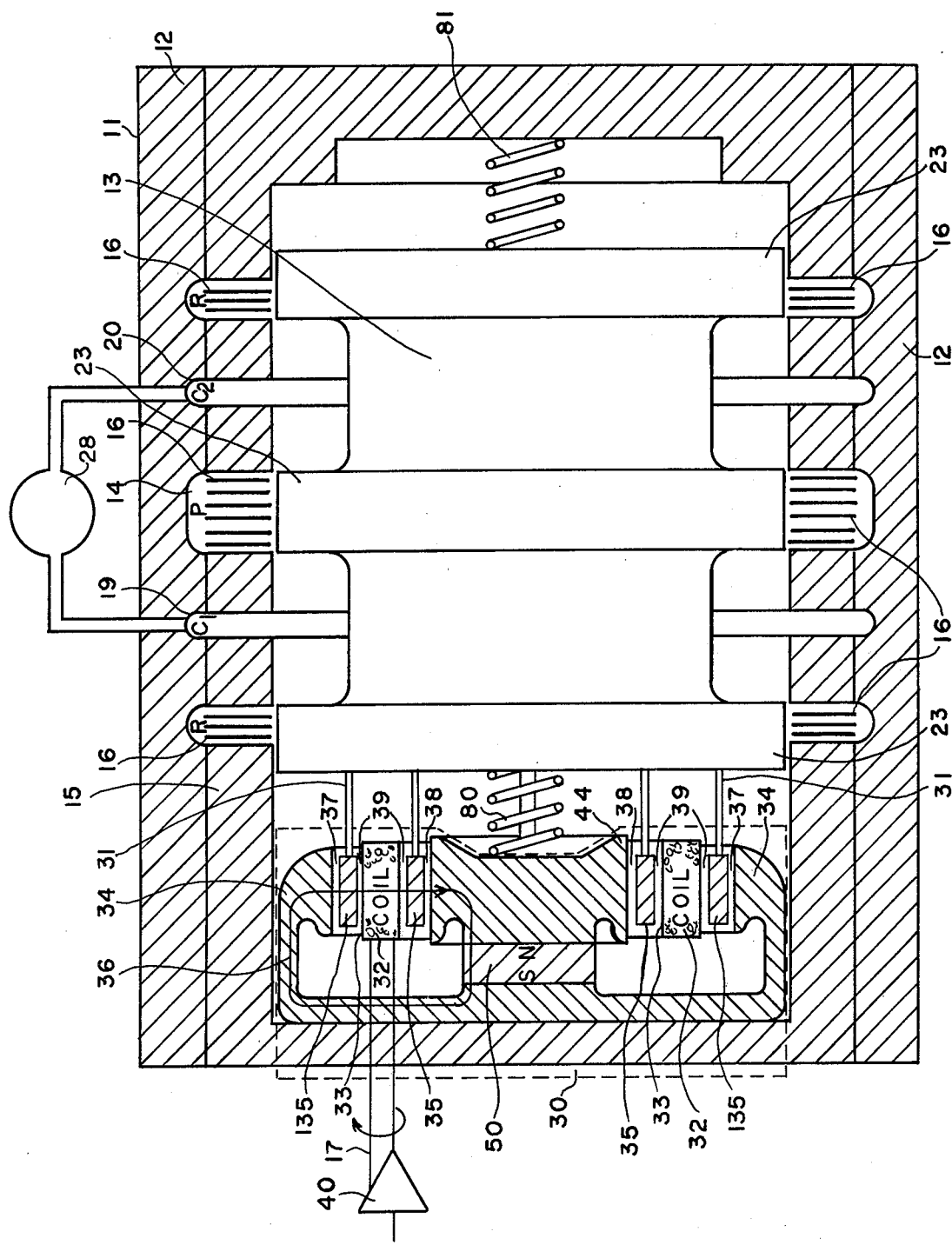

FORCE MOTOR

FIELD OF THE INVENTION

This invention relates to hydraulic systems and more particularly, to a single stage hydraulic servo valve.

BACKGROUND OF THE INVENTION

Systems have been developed that utilize a fluid for generating a force to move or hold an object or for controlling an action. Some of the aforementioned systems include electro-hydraulic servo valves that regulate a given function or variable, such as temperature, speed, pressure, force, displacement or velocity. The foregoing electro-hydraulic servo valve is responsive to an input signal for establishing a pilot fluid control pressure or pressures which is used to control the position of the spool within a valve which in turn directly controls the flow of fluid to a useful load device such as a hydraulic motor. Thus, the control valve or servo valve is a final controlling element which directly changes the value of the controlled variable in a servo control system by varying the rate of flow of some medium. Servo valves are utilized in the diving systems of submarines.

In order to avoid detection by radar and air patrols, a submarine is usually submerged. When a submarine is properly trimmed in the submerged condition, the weight and longitudinal position of the center of gravity of the submarine are equal to those of the water displaced by the submarine. As long as the submarine is moving, underwater the submarine does not have to be perfectly trimmed, diving planes are used to balance moderate positional errors. Diving planes (bell planes and stern planes) are pairs of hydrofoils which extend from the sides of the submarine. The bell planes are mounted on the forward part of the stern of the submarine and the stern planes are mounted at the aft end of the submarine. Each set is mounted on a horizontal strut which may be tilted in either direction from the horizontal to develop a vertical force on the planes and thus on the submarine. Thus, the diving planes are used to control the depth of the submarine. In order to control the submarine's depth the diving planes may be tilted from one angle to another. The tilting of the diving planes requires a large amount of energy, because the diving planes must be moved through a large amount of water. Hence, most submarine diving systems use hydraulic valves so that the diving planes may be more easily moved.

In order to find the submarine, man has developed systems like sonar which enable the operator of the sonar equipment to listen for the submarine. The listening equipment can produce signals which indicate the direction of distant sounds. In order to avoid detection the submarine must run quietly. Low noise hydraulic flow control servo valves were utilized in the prior art for controlling the steering and diving mechanisms of submarines. Two-stage hydraulic valves were used. A single stage valve was not used because a large fast-acting force motor would be required. The aforementioned two-stage valves had a force motor, a flapper valve, a pilot stage and a low noise spool type second stage. An electrical control signal was transmitted to the coils of the force motor to supply power to the force motor. The force motor was coupled to the first stage flapper valve to move the flapper from side to side so that the valve's flow nozzle may be restricted. When the flapper moved close to the nozzle, it causes the pressure behind the nozzle to rise and when the flapper moved away from the nozzle, it causes the pressure behind the nozzle to decrease. Thus, the spool would move away from high pressure to low pressure areas. The force feedback spring or wand was utilized to bring the flapper back to the center position so that in the steady state the main stage spool will stop moving. The force feedback spring is off center in an amount proportional to the input electrical signal. When the foregoing valve was used aboard submarines, the hydraulic fluid flow within the valve would be straightened or made laminar to cut down on the flow noises to make the valve quiet. The aforementioned valve is large and quite expensive because the valve has a pilot stage, a wand, and a nozzle.

SUMMARY OF THE INVENTION

This invention overcomes the disadvantages of the prior art by creating a quiet single stage valve that is driven by electrical signals. The force motor of this invention has smaller and lighter moving parts than the force motors utilized in the prior art. It also generates more power than prior art force motors, since the force motor of this invention eliminates the heavy moving parts that were used in prior art force motors. By eliminating the heavy moving parts the force motor will have to move less mass and hence it will have a faster response time. Prior art force motors did not generate enough force to hold the valve spool at a specific location within the valve sleeve. Therefore, a pilot stage was added to the prior art valves to supply additional force for controlling the valve spool. Thus, the apparatus of this invention eliminates the pilot stage or first stage of the two-stage valve so that a force motor with a small moving mass may move the valve spool directly. Thus, the displacement of the valve spool is proportional to the incoming electrical signal. Hence, the aforementioned single stage valve is simpler and cheaper than the two-stage valve utilized by the prior art.

The elimination of the pilot stage increases the reliability of the valve, since there are fewer parts to the valve. Furthermore, the contamination problem is also reduced because there is less chance for dirt and other foreign objects to enter the valve when the valve's orifice and nozzle are eliminated.

In the operation of this invention the amount of current that is applied to the coil of the force motor determines how far the main spool support moves, which in turn determines how much hydraulic fluid flows through the valve's main stage ports. The movement of the main spool support moves the spool of the valve in the valve sleeve. Since the apparatus of this invention is a force motor that moves only a small amount of the material that comprises the force motor, the size of the moving mass of the force motor may be reduced. An even smaller and lighter force motor may be used to move the main spool of a single stage valve if the force motor of this invention replaces the force motor disclosed in Hayner's copending United States patent application Ser. No. 120,039 entitled "A Single Stage Valve". The above patent application was filed in the United States Patent Office on Feb. 11, 1980. The large force motor used in the prior art also caused additional strains on the flex leads which connected the valve spool to the coil of the force motor. Since the coil of the force motor of this invention does not move the apparatus of this invention, the flex leads flexing is eliminated. Thus, the apparatus of this invention will reduce the size of the force motor as well as eliminating one stage of the hydraulic servo valve permitting the valve to be quieter since there will be less moving parts in the valve. Hence, the apparatus of this invention is a quieter valve that is cheaper to produce.

It is an object of this invention is to provide a quiet, single-stage hydraulic servo valve that utilizes a long stroke force motor in which only a small portion of the magnetic circuit moves.

Other objects, advantages and novel features of this invention will become more apparent from the following detailed description of this invention when considered in conjunction with the accompanying drawings.

BRIEF DESCRIPTION OF THE DRAWING

The sole FIGURE is a section of the apparatus of this invention.

DESCRIPTION OF A PREFERRED EMBODIMENT

Referring now to the drawing, the reference character 11 represents a single-stage valve having a valve body 12 and valve spool 13. Lands 23 are connected to spool 13. Lands 23 and spool 13 are contained with sleeve 15. Force motor 30 is coupled to land 23 by main spool supports 31. Centering spring 80 is attached to force motor 30 and land 23, and centering spring 81 is attached to sleeve 15 and land 23. Output ports 19 and 20 (also respectively labeled C, and C₂ on the drawing) are connected to hydraulic motor 28. Hydraulic fluid or oil is supplied to pressure port 14 (also shown in the drawing as P) through a high pressure source which is not shown. The hydraulic fluid flows from port 14 into ports 19 and 20, and to hardened steel sleeve 15 before going to return R. The direction in which spool 13 is moved determines if the hydraulic fluid will flow from port 19 to hydraulic motor 28 to port 20 or if the hydraulic fluid will flow from port 20 to motor 28 to port 19. The rate of flow of hydraulic fluid is proportional to the amount of movement of spool 13 within sleeve 15. Contained within sleeve 15 are laminar restriction sections 16 which may be used to reduce the noise of the flowing hydraulic fluid within valve 11. Sections 16 will most likely only be used in the case of valves that are used aboard submarines or other applications where it is necessary that the valve makes very little noise. In the event that a quiet valve is not needed, then and in that event restriction 16 would be a plain opening without quieting restrictions. Springs 80 and 81 tend to center the spool 13 in sleeve 15. Lands 23 are also contained within sleeve 15. The above lands are capable of being moved left or right of their present orientation. When hydraulic fluid flows within sleeve 15, certain reaction forces are created which tend to move spool 13 and lands 23 so that lands 23 are not closing the ports that they should be. In order to reduce the above reaction forces, spool 13 is contoured along parts of its periphery to provide cut-off edges that will prevent spool 13 and lands 23 from moving. No hydraulic fluid will enter port 14 when spool 13 is at neutral. When no current is passing through wires 17 spool 13 will be at its neutral position. Wires 17 are coupled to force motor 30 and when spool 13 is at neutral, port 14 will be shut off and little or no hydraulic fluid will flow through port 14. Since spool 13 is connected to lands 23 spool 13 may be moved left or right in order to permit or prevent hydraulic fluid from flowing through ports 14, 19 or 20. Output ports 19 and 20 are connected to hydraulic motor 28. Hydraulic motor 28 will not rotate when spool 13 is at neutral. Hydraulic motor 28 may be used to drive other equipment like the diving equipment aboard a submarine. Spool 13 is moved along sleeve 15 by means of force motor 30.

Force motor 30 comprises a stationary magnetic material that has two pole pieces 34 and 44. Permanent magnet 50 is connected to materials 34 and 44. Magnet 50 has a north pole which is shown in the drawing as N and a south pole that is shown in the drawing as S. The wires 32 that are wound to form a coil 33 are perpendicular to the plane of the paper. Outer iron ring 135 is perpendicular to the plane of the paper and ring 135 is positioned outside of coil 32. Inner iron ring 35 is perpendicular to the plane of the paper and ring 35 is positioned inside of coil 32. Rings 135 and 35 are moveable and they are connected to land 23 by main spool supports 31. Gap 37 is a space that exists between rings 135 and material 34 and gap 38 is a space that exists between rings 35 and material 44. Gap 39 is the space in which coil 33 was placed. Gaps 37, 38 and 39 are perpendicular to the plane of the paper.

When a current is present in wires 17, the current is transmitted to wires 32 and a reaction occurs between the wires 32 that comprise coil 33 and the iron 34 which causes rings 35 and 135 which are connected to main spool supports 31 to move within the confined flux path.

When wires 17 transmit a current, a force is created across gaps 37, 38 and 39. Permanent magnet 50 and the current are responsible for the creation of this force. If conductor 32 is in the field gap 39, a force is produced on the conductor 32 and a equal and opposite force is produced on the magnetic circuit. The magnetic circuit comprises magnetic materials 34, and 44 and a permanent magnet 50 which is tied to materials 34 and 44. Iron rings 35 and 135 are connected to land 23 by main spool supports 31. If no current is transmitted on wires 17, no force is produced by force motor 30 and main spool supports 31 will remain stationary. The force that is created by force motor 30 is resisted by the mass of the force motor and springs 80 and 81 which resists the displacement of the main spool supports. Thus, the time it takes for force motor 30 to translate from zero current position to maximum current position is a function of the moving mass of main spool supports 31 the mass of spool 13, the mass of lands 23 and the spring constant of springs 80 and 81. The foregoing is an example of a second order system in which the resonance frequency will be obtained.

The reluctance of iron is low and the reluctance of air is high. Hence, the magnetic flux 36 which was created by the current passing through wires 17 must jump through a high reluctance area which is created by extremely small air gaps 37 and 38, and large air gap 39 (conductor 32 is shown within gap 39). The magnetic flux 36 must also pass through low reluctance iron 34. Current is transmitted to wires 17 via amplifier 40.

The magnitude of the current output of amplifier 40 determines the distance that main spool supports 31 will move. If amplifier 40 has a voltage output of one polarity then main spool supports 31 will move left. When amplifier 40 has the opposite output polarity then main spool supports 31 will move right. When main spool supports 31 remains stationary the voltage output by amplifier 40 will be zero. When the foregoing happens no current will be transmitted to wires 32.

The motor action of force motor 30 has to do with the current crossing the lines of flux which causes a reaction force between the wire and the magnetic circuit, which in turn causes main spool supports 31 of valve 11 to move left or right within sleeve 15. Thus, the amount of current that is transmitted to wires 32 determines how far main spool supports 31 will move which in turn determines the location of spool 13 within sleeve 15. The amount of hydraulic fluid that is flowing through valve 11 is dependent upon the location of spool 13 within sleeve 15. Force motor 30 is used to convert an electrical input into a linear motion of main spool supports 31.

Force motor 30 works against centering springs 80 and 81. Force motor 30 only moves a small amount of iron i.e., rings 35 and 135, and main spool supports 31. Rings 35 and 135 are made of soft iron and supports 31 are made of any nonmagnetic material like stainless steel or aluminum. Therefore, an advantage of force motor 30 is that only main spool supports 31 and those parts connected thereto will move. Thus, the major part of force motor 30 will not move, in fact iron 34, 44 and permanent magnet 50 will remain stationary. By only having a small portion of force motor 30 move, the mass that must be moved will be reduced permitting force motor 30 to be operated in any attitude with an increased speed of response and without any additional hydraulic amplification.

The above specification has described a new and improved hydraulic system. It is realized that the above description may indicate to those skilled in the art additional ways in which the principles of the invention may be used without departing from its spirit. It is, therefore, intended that this invention be limited only by the scope of the appended claims.

What I claim is:

1. A system for moving the spool of a hydraulic valve along the sleeve of a single-stage hydraulic valve that has hydraulic fluid input and return ports, said system comprising:

(a) a first stationary magnetic material;
(b) a second stationary magnetic material, said second material is coupled to said first material in such a manner that a space exists between said first and second materials;
(c) a permanent magnet which is coupled linearly to said first and second stationary material;
(d) a coil of wire that is coupled to electrical input signals, said coil of wire is positioned within said space;
(e) a first ring that is positioned on the outside of said coil; a second ring that is positioned on one of the sides of said coil, opposite said first ring; and a plurality of support members that connect said first and second rings to said spool;

whereby if an electric input signal is present on said coil a magnetic force will be produced on said coil and said magnet causing said first and second ring to move in an amount proportional to said input signal.

2. The system claimed in claim 1 wherein said first ring is made of a ferromagnetic material.

3. The system claimed in claim 1 wherein said ferromagnetic material is iron.

4. The system claimed in claim 1 wherein said second ring is made of a ferromagnetic material.

5. The system claimed in claim 1 wherein said ferromagnetic material is iron.

6. The system claimed in claim 1 further including means for reducing the noise that results when hydraulic fluid flows from said input ports to said return ports, said reducing means being connected to said return ports.

7. The system claimed in claim 6 wherein said reducing means comprises a plurality of thin intricate passageways through which hydraulic fluid flows, said passageways make the hydraulic fluid flow laminar to cut down on the flow noises produced by the flowing hydraulic fluid.

* * * * *